(12) United States Patent
Mullally

(10) Patent No.: US 7,032,905 B2
(45) Date of Patent: Apr. 25, 2006

(54) LEAK RESISTANT SEAL

(76) Inventor: Michael J. Mullally, 46 Stephens St., Clifton Springs, NY (US) 14432

( * ) Notice: Subject to any disclaimer, the term of this patent is extended or adjusted under 35 U.S.C. 154(b) by 0 days.

(21) Appl. No.: 10/947,512

(22) Filed: Sep. 22, 2004

(65) Prior Publication Data

US 2006/0061047 A1    Mar. 23, 2006

(51) Int. Cl.
F16J 15/02 (2006.01)
F16L 17/00 (2006.01)

(52) U.S. Cl. ............... 277/647; 277/652; 277/626; 285/110; 285/111

(58) Field of Classification Search .......... 277/647, 277/626, 652; 285/110, 111
See application file for complete search history.

(56) References Cited

U.S. PATENT DOCUMENTS

| | | | | |
|---|---|---|---|---|
| 3,058,750 A | * | 10/1962 | Taylor | 277/312 |
| 3,083,023 A | * | 3/1963 | Creavey | 277/647 |
| 3,163,431 A | * | 12/1964 | Tanner | 277/381 |
| 3,285,615 A | * | 11/1966 | Trbovich | 277/639 |
| 3,290,047 A | * | 12/1966 | Mayer | 277/647 |
| 3,339,948 A | * | 9/1967 | Weitzel | 285/331 |
| 3,713,660 A | * | 1/1973 | Luthe | 277/644 |
| 4,361,331 A | * | 11/1982 | Kohler | 277/314 |
| 4,877,272 A | * | 10/1989 | Chevallier et al. | 285/111 |
| 5,044,672 A | * | 9/1991 | Skeels et al. | 285/98 |
| 5,354,072 A | * | 10/1994 | Nicholson | 277/647 |
| 5,630,593 A | * | 5/1997 | Swensen et al. | 277/626 |
| 6,869,080 B1 | * | 3/2005 | Janoff et al. | 277/603 |

* cited by examiner

*Primary Examiner*—Alison K. Pickard
(74) *Attorney, Agent, or Firm*—Brown & Michaels, PC

(57) ABSTRACT

A seal includes a resilient carrier with opposed limbs holding sealing rings that engage sealing surfaces. The seal is oriented so that a space between the limbs is exposed to a higher than ambient pressure that biases the limbs apart to increase the force pressing the sealing rings against sealing gland surfaces.

11 Claims, 8 Drawing Sheets

DETAIL A

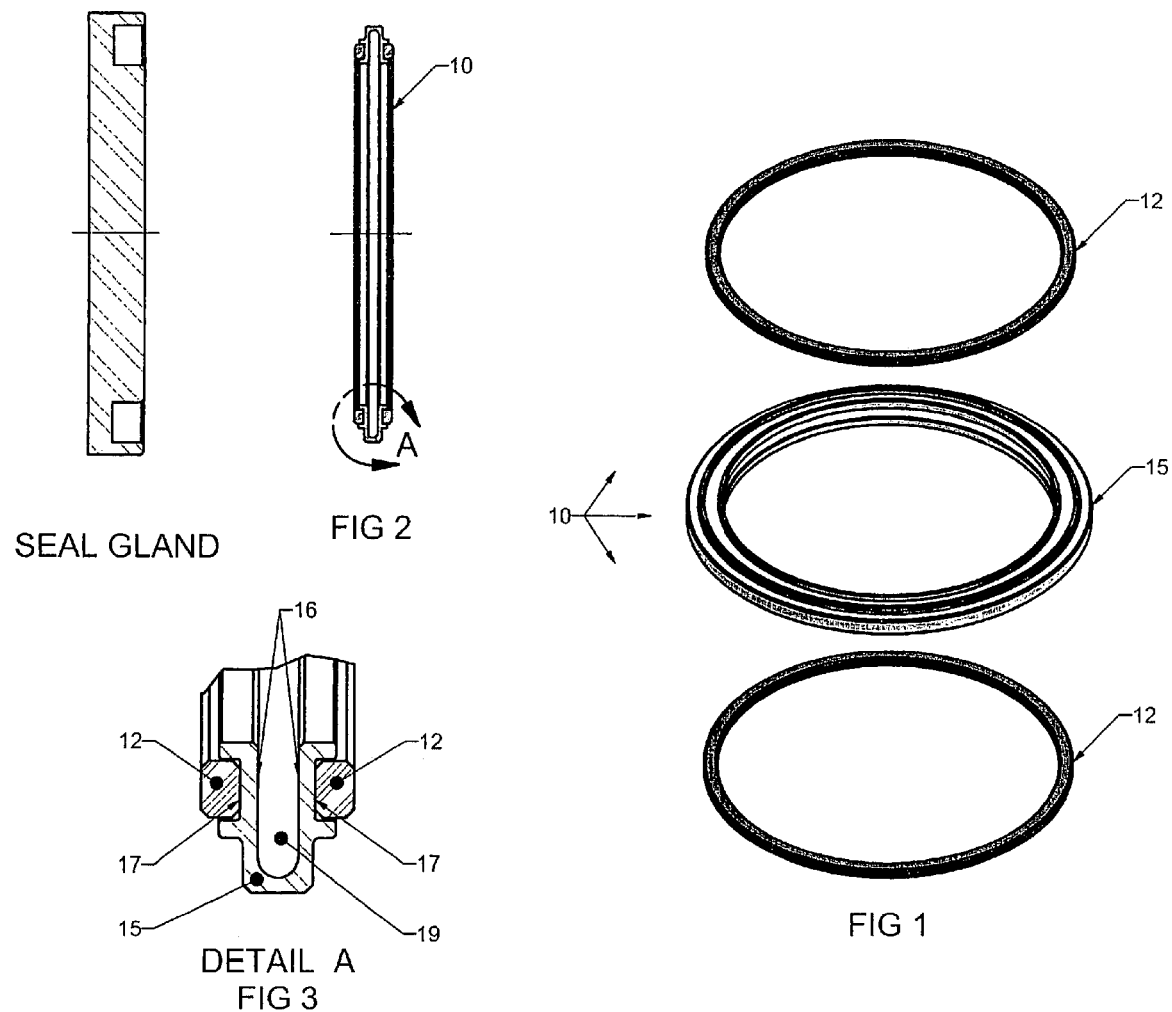

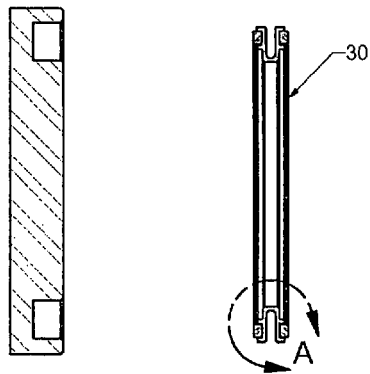
SEAL GLAND          FIG 6
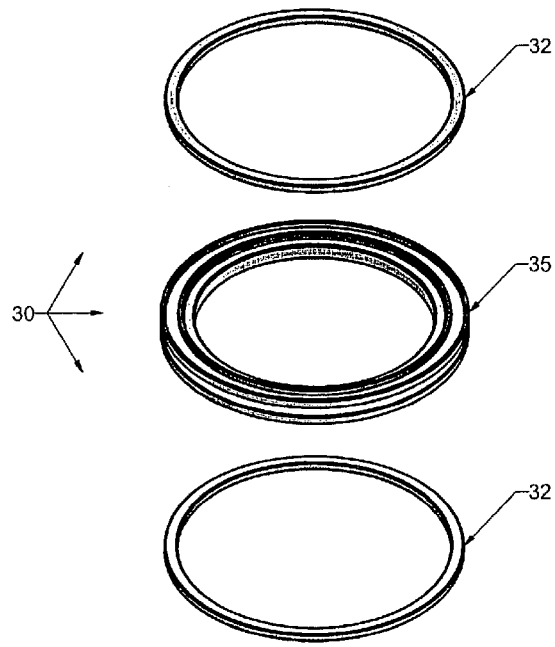
FIG 5
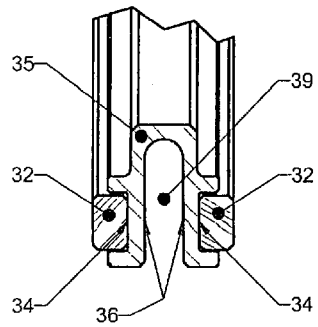
DETAIL A
FIG 7

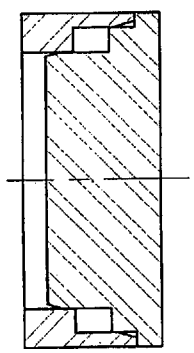
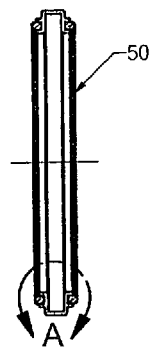
SEAL GLAND
FIG 10
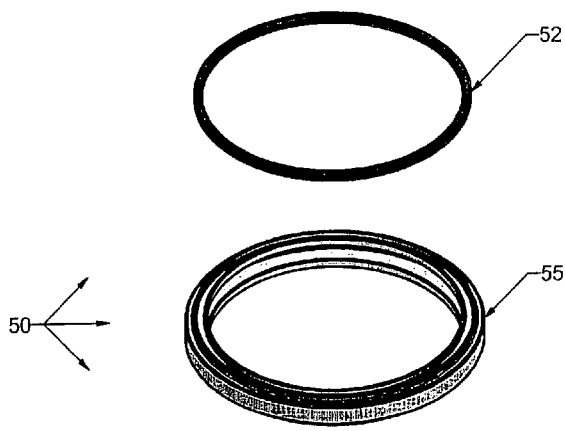
FIG 9
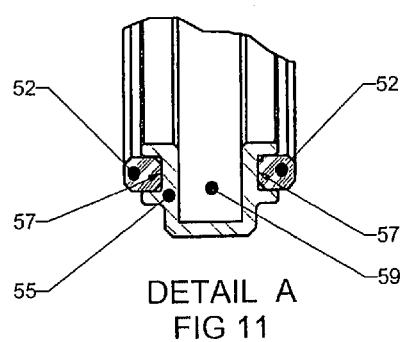
DETAIL A
FIG 11

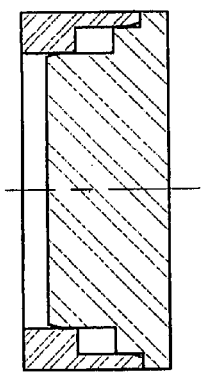
SEAL GLAND
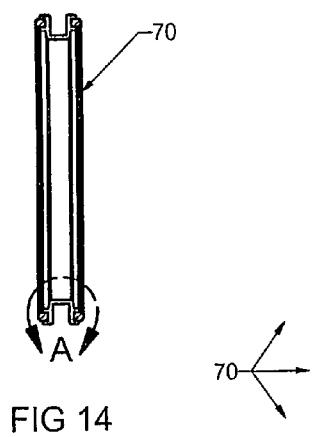
FIG 14
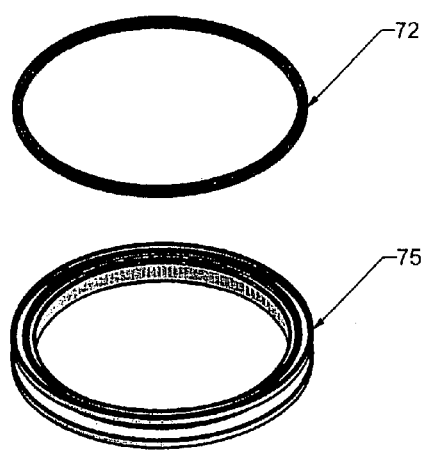
FIG 13
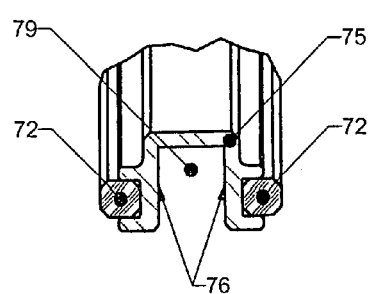
DETAIL A
FIG 15

LEAK RESISTANT SEAL

BACKGROUND OF THE INVENTION

1. Field of the Invention

Fluid seals.

2. Description of Related Art

Presently available seals leak when especially challenged to seal against high and variable pressure differences, and to securely confine important or valuable fluids. Not only do presently available seals leak under such circumstances, but their leakage is variable and unpredictable.

The invention aims to improve the leak resistance of seals used for such challenging circumstances. The invention also aims to provide seals that are reliable, highly leak resistant, predictable, and inexpensive enough to be used in many applications.

SUMMARY OF THE INVENTION

The inventive seal accomplishes its improvements by using a resilient carrier holding compressible sealing rings. The sealing rings are preferably arranged on opposed limbs of the carrier, and the carrier is formed to have a resistance bias against pressing the limbs, with their sealing rings, toward each other. Then when the seal is installed in a sealing position, the resilient carrier limbs are squeezed together, which the carrier resists by pressing the sealing rings against sealing surfaces.

In such a sealing position, a space between the opposed carrier limbs is preferably exposed to a higher pressure than outer surfaces of the limbs bearing the sealing elements. Orienting the seal to expose the space between the resilient limbs to a higher pressure effectively exploits a pressure difference between a sealed fluid and an ambient atmosphere, which is used to increase the outward bias of the carrier limbs. This helps the seal remain leak resistant during variations in the sealed and unsealed pressure differences.

DRAWINGS

Four related and preferred versions of the inventive seal are shown schematically in FIGS. 1–4, 5–8, 9–12, and 13–16, respectively.

Within these figure groups,

FIGS. 1,5,9, and 13 show exploded views of preferred circular embodiments of resilient carriers and compressible sealing rings.

FIGS. 2,6,10, and 14, show diametrical cross-sections of the seals of FIGS. 1,5,9, and 13 respectively.

FIGS. 3,7,11, and 15 show enlarged fragments of the views of FIGS. 2,6,10, and 14, respectively.

FIGS. 4,8,12, and 16 show enlarged, fragmentary views of typical installations of the seals of FIGS. 1,5,9, and 13, respectively.

DETAILED DESCRIPTION OF THE INVENTION

The preferably circular seal assembly 10 is shown in an exploded form in FIG. 1, in a cross sectional form in FIG. 2, and in an enlarged cross sectional fragment in FIG. 3. A similar cross sectional fragment is shown schematically installed between sealing surfaces of a sealing gland in FIG. 4.

Figure 4:
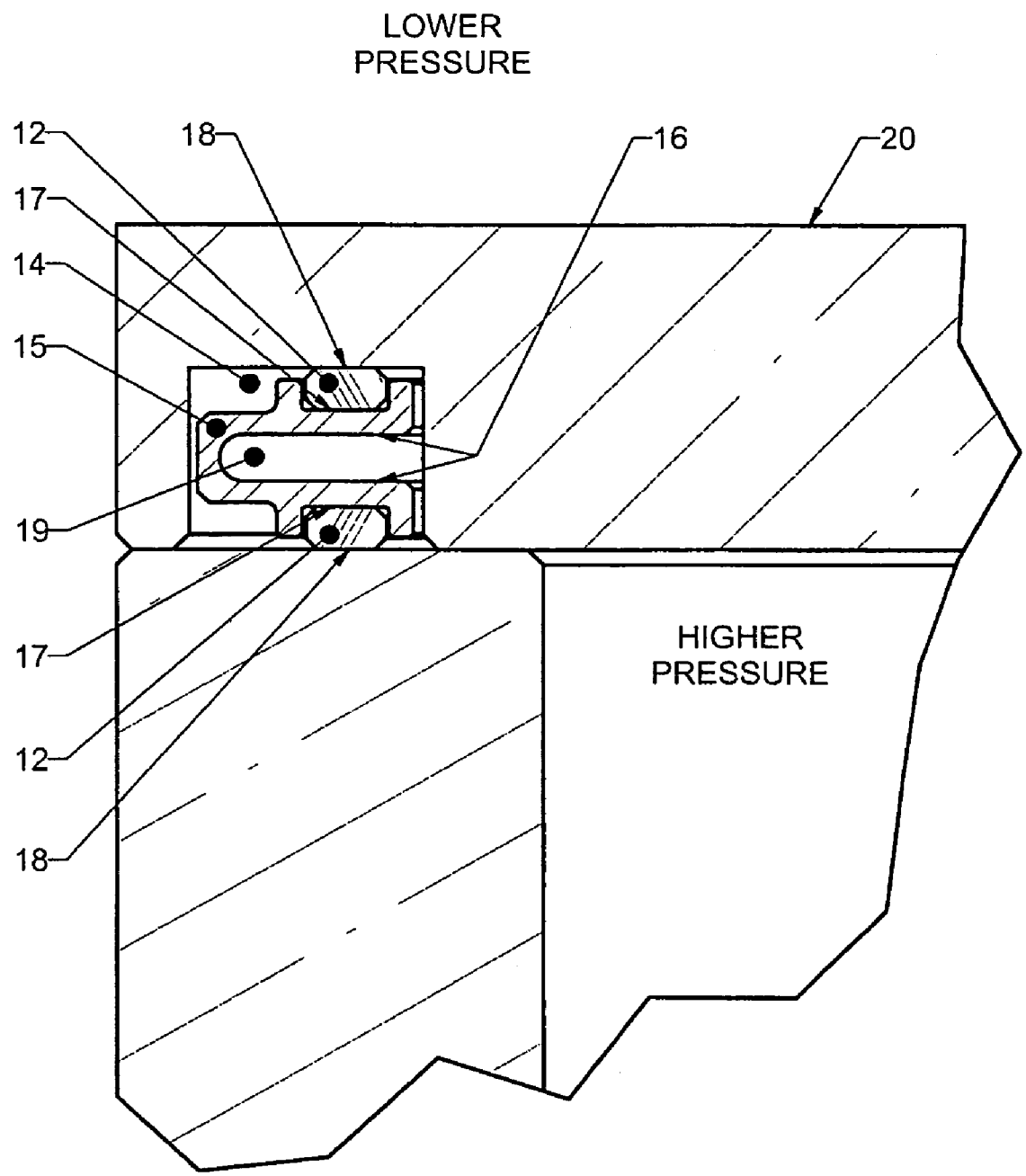
Figure 8:
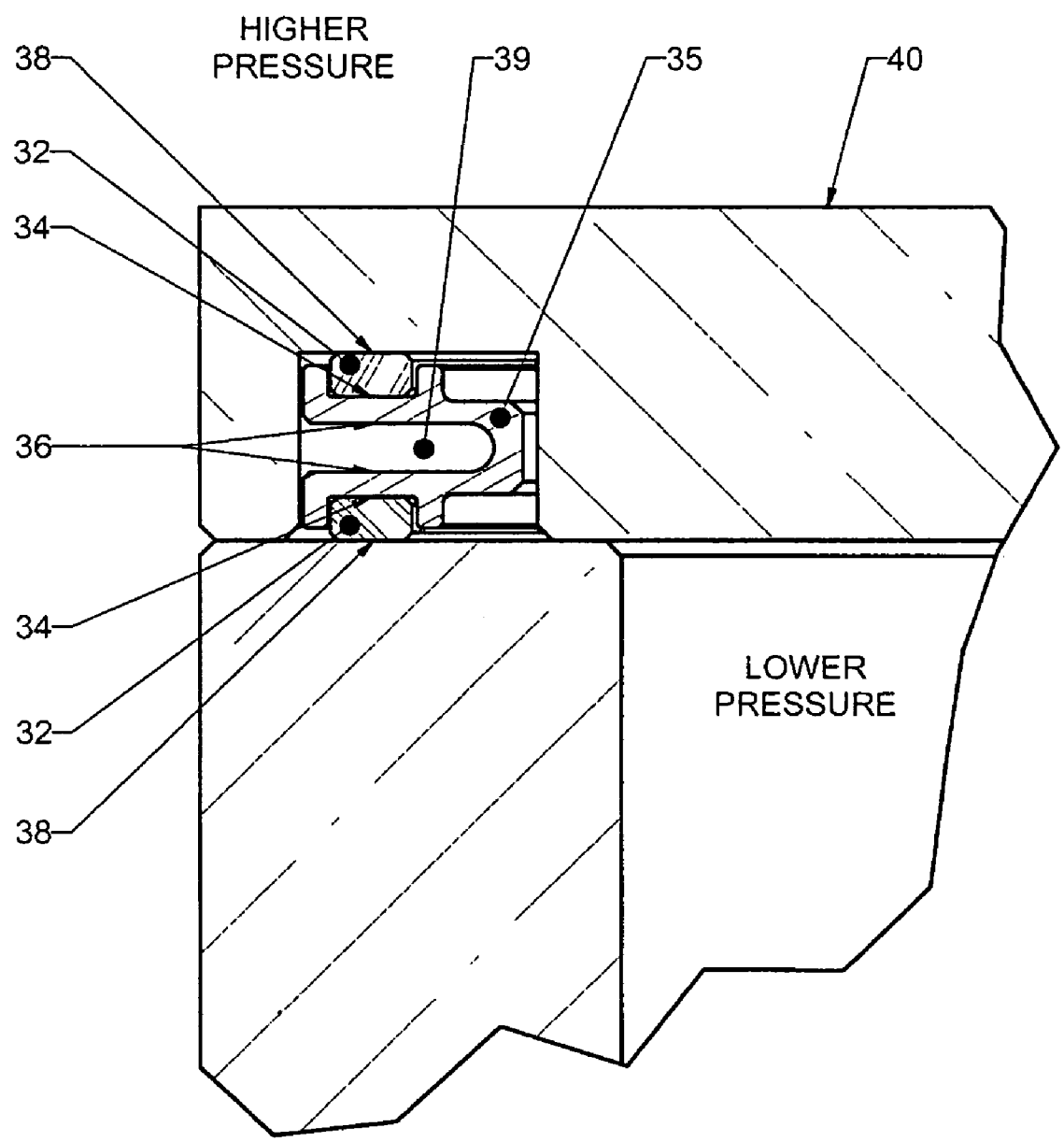

Assembly 10 comprises a resilient carrier 15 and a pair of sealing rings 12. Carrier 15 is preferably formed with a pair of opposed limbs 16, the outward facing surfaces of which have grooves 17. Rings 12 are fitted into grooves 17 to form seal assembly 10, which can then be deployed as schematically shown in FIG. 4.

Carrier 15 is preferably formed of resilient material, which can include a variety of metals and resins that are spring-like in their capability of developing a resilient bias against deformation. For cross-sectionally U-shaped carrier 15, as illustrated in FIGS. 2–4, the resilient bias opposes pressing or squeezing of limbs 16 and seals 12 toward each other to make the U-shape narrower.

Carrier 15 is preferably machined of a spring steel alloy such as 17-1, 18-8, 3C2, and the Inconel® family of metals. Other spring steel alloys can also be used, as well as resilient resin carriers. The aim is to give seal assembly 10 significantly more resilience than can be expected from relying on the more limited resilience of sealing elements engaging sealing surfaces. It also allows the combined resilience of carrier 15 and sealing elements 12 to be applied in a limited or confined space. For example, carrier 15 and sealing rings 12 are preferably formed to have a compact shape or low-profile in an axial direction to meet the dimensional needs of face or axial seals, such as schematically shown in FIG. 4.

Sealing rings 12, can also be made of a wide variety of materials that are preferably compressible, resilient, and resistant to fluids encountered in a sealing application. They also preferably compress evenly so that they can engage sealing surfaces smoothly and reliably. Examples of suitable materials for sealing rings 12 include Kel-F, Torlon®, PEEK, Vespel®, and the Teflon® families. Grooves that are formed in carriers 15, 35, 55, and 75 are preferably made deep enough to receive more than half the thickness of respective sealing rings. This helps the sealing rings deform in compression, rather than bulging laterally as they are pressed against sealing surfaces.

When seal 10 is deployed in a gland 14 of a closed container 20, as schematically shown in FIG. 4, seal engaging surfaces 18 are drawn close enough together to press sealing elements 12 and limbs 16 of carrier 15 toward each other. This causes carrier 15 to flex, which the resilience of carrier 15 opposes, so that a resistance bias of carrier 15 to such inward flexing of limbs 16 in effect presses sealing elements 12 against seal engaging surfaces 18 for a secure seal. Elements 12 contribute to the security of the seal by being resilient and evenly compressible themselves.

The seal that is accomplished in the installation illustrated in FIG. 4 is enhanced by orienting carrier 15 so that an interior space 19 between sealing limbs 16 is oriented toward a higher pressure region inside container 20. This subjects interior space 19 to a higher pressure than exists outside of interior space 19; and this higher interior pressure tends to spread apart limbs 16, which adds to the outward bias of carrier 15. The greater the pressure difference between the inside and outside of container 20, the more the outward bias of carrier 15 is enhanced and the more secure is the sealing action. In effect, the larger pressure difference to be sealed against increases the sealing ability of the seal assembly by increasing the force pressing sealing elements 12 against sealing surfaces 18. In other words, when a large pressure difference makes sealing more difficult, the seal automatically becomes more reliable.

The axial or face seal assembly 30 of FIGS. 5–8 is similar to seal assembly 10, except for having a cross-sectional U-shape that is oriented radially outward, rather than radially inward, to seal against a higher outside pressure. The importance of this is best shown schematically in FIG. 8 where seal assembly 30 is oriented so that a space 39 between opposed carrier limbs 36 is oriented toward a higher pressure ambient or outside region. This exposes the interior carrier space 39 to the higher outside pressure, which enhances the outward bias of carrier 35. The greater the difference between the lower pressure of the fluid sealed within container 40 and the higher ambient pressure, the more carrier 35 exerts an outward bias. In effect, seal 30 expands within the sealing gland 34 to press sealing rings 32 against sealing surfaces 38 with a force that is a function of a pressure difference between the higher and lower pressure regions.

Figure 12:
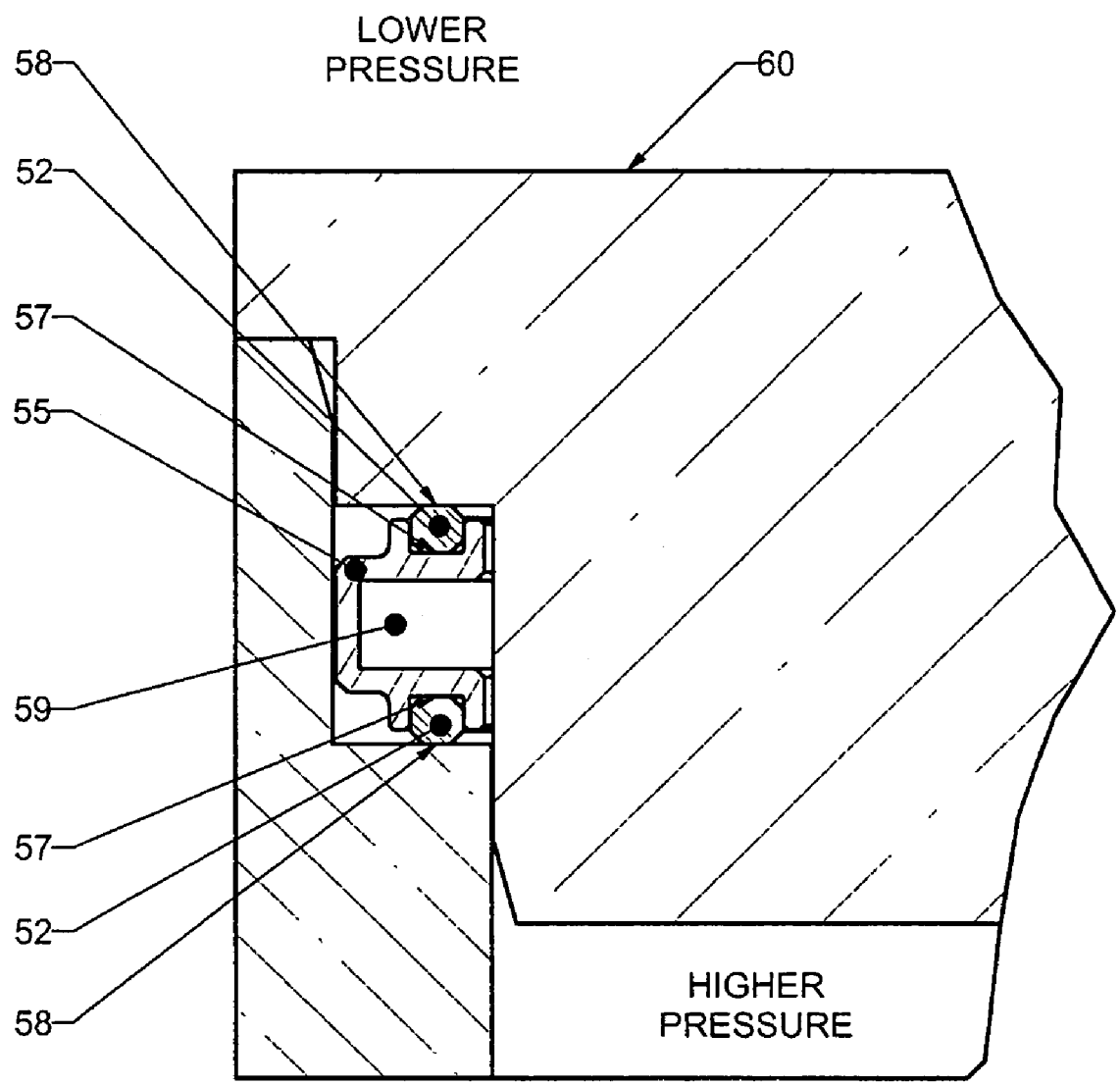

Seal assembly 50, as shown in FIGS. 9–12 is similar to seal assemblies 10 and 30, except for being formed to serve as a radial seal, rather than a face or axial seal. This difference is best shown in FIG. 12 where seal assembly 50 is fitted radially around a sealing gland 56 and is compressed axially between sealing surfaces 58 when container 60 is closed. Otherwise, seal assembly 50 is similar in using a resilient carrier 55 having grooves 57 receiving sealing elements 52. Seal assembly 50 is also oriented so that an interlimb space 59 is exposed to a higher pressure within a sealed and contained region. Seal assembly 50 is formed to be radially compact to take up no more space than necessary in fitting radially around a portion of a container 60 to be sealed.

Figure 16:
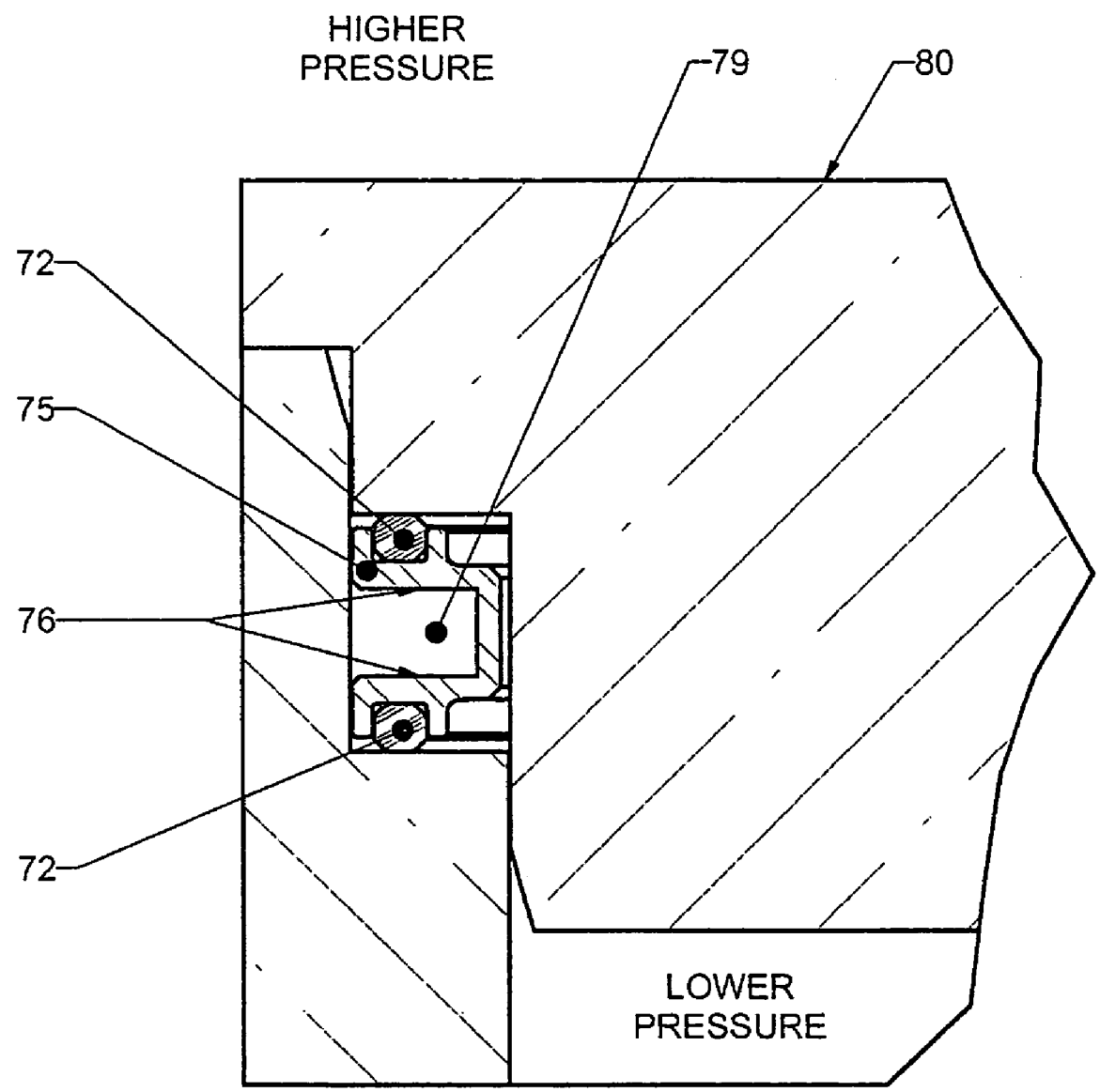

Seal assembly 70, as shown in FIGS. 13–16, is similar to seal 50 except for reversing the orientation of the cross-sectional U-shape of carrier 75. This exposes internal seal region 79 to a higher pressure external region, as shown in FIG. 16 to increase the outward bias of carrier limbs 76 pressing seals 72 outward and to help seal the lower pressure contents of container 80.

The illustrated preferred embodiments can be varied in many ways that are not shown. Different configurations of carriers can produce flexible limbs having grooves formed in different limb regions. A circular form with a cross-sectional U-shape is preferred for resilient seal carriers, but other forms or x, y, or other cross-sectional shapes are also possible.

What is claimed is:

1. A seal comprising:
   a. a resilient carrier having a pair of opposed limbs each limb having an inward facing, confronting surface and an outward facing surface and the limbs being joined by a resilient connecting region that resists flexing the limbs resiliently inward toward each other;
   b. each of the outward facing surfaces of the limbs having a groove facing outward so that the grooves face away from each other;
   c. a compressible, resilient and non-metallic sealing element arranged in each groove; and
   d. the carrier in a sealing position being arranged so that the limbs are flexed toward each other, which the connecting region between the limbs resists with sufficient force to press the sealing elements away from each other and firmly against sealing surfaces.

2. The seal of claim 1 wherein a fluid pressure between the limbs increases the resistance of the limbs to flexing toward each other.

3. The seal of claim 1 wherein more than half of a compressible thickness of the sealing elements is retained in the grooves, so that compression of the sealing elements occurs within the grooves.

4. A fluid seal comprising:
   a. a spring metal carrier having a U-shape in cross section with limbs of the U-shape having inward and outward facing surfaces;
   b. the carrier being arranged in a sealing position to flex the limbs of the U-shape inward, which a connecting region between the limbs resists with a counteracting outward spring bias of the limbs toward sealing surfaces;
   c. each of the outward facing surfaces of the limbs of the U-shaped carrier having a groove;
   d. a compressible, resilient and non-metallic sealing element arranged in each of the grooves so that a major portion of the thickness of each sealing element is housed in its respective groove and a minor portion of the thickness of each sealing element extends beyond its respective groove so that compression of the sealing elements occurs within the grooves; and
   e. the outward bias of the carrier limbs presses the minor portion of the sealing elements against the sealing surfaces forcefully enough to reduce sliding of the sealing elements against the sealing surfaces as pressure differences vary between a pressure of a sealed fluid and an ambient pressure.

5. The seal of claim 4 wherein the sealing elements are removable from the grooves for cleaning or replacement.

6. The seal of claim 4 wherein the carrier is oriented so that the inward facing surfaces of the limbs are exposed to a higher pressure than the outward facing surfaces of the limbs.

7. The seal of claim 6 wherein the outward bias of the carrier limbs varies as a function of a pressure difference between the inward and the outward facing surfaces of the carrier limbs.

8. A fluid seal comprising:
   a. a carrier having flexible, opposed, and interconnected limbs having confronting inward faces and outward facing surfaces;
   b. a compressible, resilient and non-metallic sealing element arranged in a groove on each outward facing surface of each limb of the carrier;
   c. the carrier being arranged in a sealing position so that a pressure difference between a higher pressure between the limbs and a lower pressure outside the limbs biases the limbs apart; and
   d. the carrier in the sealing position being arranged so that the limbs are flexed toward each other, and a connecting region between the limbs biases the limbs apart with a spring force that compresses the sealing elements against sealing surfaces.

9. The seal of claim 8 wherein the carrier is machined of spring metal.

10. The seal of claim 8 wherein a major portion of each of the sealing elements is arranged in each respective groove with a minor portion of each of the sealing elements extending beyond the grooves.

11. The seal of claim 10 wherein the grooves and the sealing elements have mating fits that allow the sealing elements to be compressed within the grooves.

* * * * *